HOBBS & BOYDEN.
MACHINE FOR FORMING CARTRIDGE SHELLS.
No. 94,745.  Patented Sept. 14, 1869.
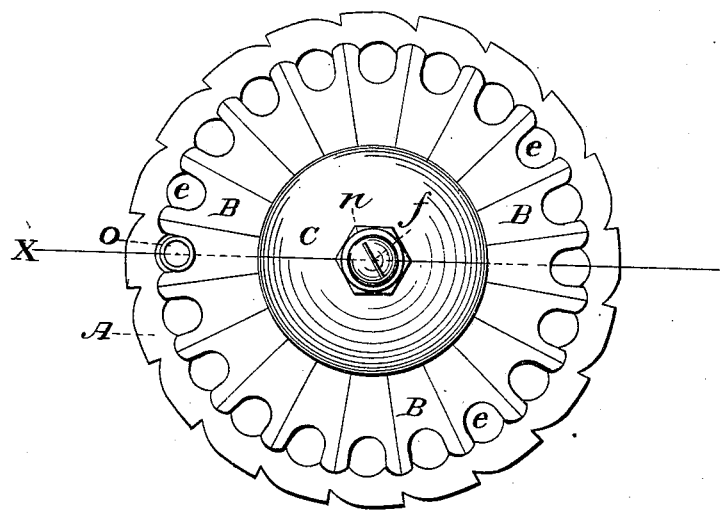
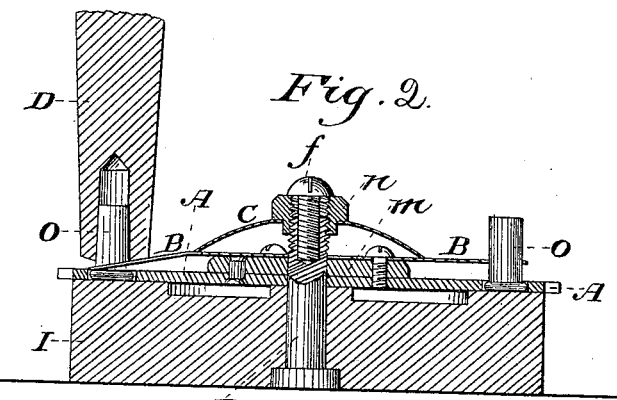
Witnesses:
L. Hailer
P. T. Dodge
Inventor:
A. C. Hobbs
F. V. Boyden
by Dodge & Munn
their attys

United States Patent Office.

A. C. HOBBS AND THOMAS V. BOYDEN, OF BRIDGEPORT, CONNECTICUT, ASSIGNORS TO THE UNION METALLIC-CARTRIDGE COMPANY, OF SAME PLACE.

Letters Patent No. 94,745, dated September 14, 1869.

IMPROVEMENT IN MACHINES FOR FORMING CARTRIDGE-SHELLS.

The Schedule referred to in these Letters Patent and making part of the same.

*To all whom it may concern:*

Be it known that we, A. C. HOBBS and THOMAS V. BOYDEN, of Bridgeport, in the county of Fairfield, and State of Connecticut, have invented certain new and useful Improvements in Cartridge-Machines; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention relates to machinery used for manufacturing metallic cartridge-shells and similar articles; and The invention consists in providing the apparatus with a series of spring-arms, which serve to hold the shells upright in proper position to be presented to the die; and It further consists in the use of a spring-washer for holding the rotary disk with the required degree of friction, all as hereinafter more fully explained.

In the drawings—

Figure 1 is a top plan view, and

Figure 2 is a transverse vertical section on the line *x x* of fig. 1.

In the manufacture of metallic cartridge-shells, it is customary to use a rotary disk for carrying the shells successively around to the die, to be acted on, and as this disk is moved intermittently, the shells, which stand on end, are liable to be tipped over by the sudden starting and stopping of the disk; and if a rigid arm or support of any kind be used to hold the shells upright, it is in the way of the descending die.

As heretofore constructed, the revolving disk is secured upon its axis, and has to be held by one pawl, while the operating-pawl is being drawn back for a new movement.

To avoid these difficulties, we construct our improved device as follows:

The disk A is mounted on a suitable stand or block, I, and is provided with a series of holes or recesses, *e*, of proper size to receive the heads of the shells O, and is provided on its edge with a series of notches, for the pawl to engage in, in the usual manner.

The disk A is secured in place by a pin or bolt, E, at its centre, as shown in fig. 2, and to the upper face of the disk is secured a washer or plate, *m*, about one-third the diameter of the disk; and above this plate *m*, and resting thereon, we place a circular plate of spring-steel, or similar material, this plate being cut radially, as shown in fig. 1, so as to form a series of flat springs or arms, B, each of which has a notch or recess cut in its outer end, of sufficient size to permit the cartridge-shell to rest therein, this notch or recess being arranged directly over the holes *e* in the disk A, in which the shells are set, a shell, O, being shown thus in position in fig. 1.

Instead of forming these arms B by splitting a plate, as described, it is obvious that they may be formed of separate pieces arranged in a similar manner, the object being to have them so arranged as to hold the shells upright and prevent their tipping over.

In using the device for tapering the shells, the arms B serve to hold the shells upright while they are carried around under the tapering-die D, when the latter descends, and as the spring-arm B yields as the die descends, as represented in the left-hand part of fig. 2, the die can descend far enough to taper the shell O its entire length, as there shown.

Above the plate which forms the arms B, or over the inner ends of the arms themselves, if made separately, or on the dial, if used without the springs, we place a spring-washer, C, as shown in figs. 1 and 2.

This washer consists of a disk of thin metal, struck up into a concavo-convex form, as shown in section in fig. 2, with a hole in its centre.

This washer being placed on the spring-arms B, at the centre, or on an ordinary dial without the springs, is secured in position by a nut, *n*, which is screwed on to the central pivot or bolt E; and to prevent this nut from becoming unloosed, we insert into the end of the bolt a screw, *f*, which has its thread cut in a reverse direction from that of the nut *n*, one having a right and the other a left-hand screw.

By screwing down the nut *n*, the spring-washer may be made to press upon the arms B and the disk A with sufficient force to create any desired degree of friction, and thus to hold the disk A securely in place while the pawl that actuates it is being drawn back to engage in the next notch, preparatory to the next movement forward.

It also serves to prevent the disk from being carried by its momentum at all beyond the point to which the pawl moves it, thereby preventing the shell from being moved past the mouth of the die, and insuring the required degree of accuracy in its movements.

By this method of constructing a spring-dial, we produce a machine that enables the shell to be tapered its whole length, and at the same time prevents the shell from being accidentally tipped over, and, by the spring-washer C, secures any amount of friction that may be required to insure the proper action of the revolving disk.

Having thus described our invention,

What we claim, is—

1. The spring-arms B, or their equivalents, for holding the shells securely in an upright position, substantially as described and for the purpose set forth.

2. The spring-washer C, when arranged in combination with rotating disk A, for the purpose of regulating the friction or pressure thereon, substantially as described.

A. C. HOBBS.
T. V. BOYDEN.

Witnesses:
ROBT. J. WHITE,
HENRY C. RYLANDS.